US011529720B2

(12) United States Patent
Kovacs, II (10) Patent No.: US 11,529,720 B2
(45) Date of Patent: Dec. 20, 2022

(54) TORQUE SENSOR SYSTEM

(71) Applicant: APEX BRANDS, INC., Apex, NC (US)

(72) Inventor: Stephen Francis Kovacs, II, Lexington, SC (US)

(73) Assignee: Apex Brands, Inc., Apex, NC (US)

( * ) Notice: Subject to any disclaimer, the term of this patent is extended or adjusted under 35 U.S.C. 154(b) by 336 days.

(21) Appl. No.: 16/868,913

(22) Filed: May 7, 2020

(65) Prior Publication Data

US 2020/0361067 A1 Nov. 19, 2020

Related U.S. Application Data

(60) Provisional application No. 62/848,851, filed on May 16, 2019.

(51) Int. Cl.
*B25F 5/00* (2006.01)
*B25B 23/14* (2006.01)
*G01L 3/26* (2006.01)

(52) U.S. Cl.
CPC .......... *B25B 23/1405* (2013.01); *B25F 5/001* (2013.01); *G01L 3/26* (2013.01)

(58) Field of Classification Search
CPC ....... B25B 23/1405; B25F 5/001; G01L 3/26; G01L 3/10; G01L 3/101; G01L 3/108; H01F 38/14; H02J 50/12; H02J 50/402

USPC ..................................... 173/93.5, 176, 181
See application file for complete search history.

(56) References Cited

U.S. PATENT DOCUMENTS

2005/0150335 A1\* 7/2005 Crane .................. B23P 19/066
173/176
2016/0352148 A1\* 12/2016 Ichikawa ................ H02J 50/80

FOREIGN PATENT DOCUMENTS

EP 2246680 A2 \* 11/2010 ............. B25B 21/00

\* cited by examiner

*Primary Examiner* — Andrew M Tecco
*Assistant Examiner* — Jacob A Smith
(74) *Attorney, Agent, or Firm* — Burr & Forman, LLP (57) ABSTRACT

A rotating power tool is provided. The rotating power tool may include a bevel gear set having a bevel gear and a conductive spiral disposed on the bevel gear. The conductive spiral may be configured to, in response to the bevel gear deforming due to a torque being applied to the bevel gear, change a resistance of the conductive spiral. The rotating power tool may further include an antenna electrically connected to the conductive spiral. The antenna may be configured to emit an output signal at a frequency that is based on the resistance value of the conductive spiral. The frequency of the output signal may be indicative of an amount of torque being applied to the bevel gear.

16 Claims, 6 Drawing Sheets

TORQUE SENSOR SYSTEM

CROSS REFERENCE TO RELATED MATTERS

This application claims the benefit of U.S. Provisional application No. 62/848,851 filed on May 16, 2019, which is expressly incorporated by reference herein in its entirety.

TECHNICAL FIELD

Example embodiments generally relate to sensor technology, and more particularly relate to torque sensors implemented on rotating tools.

BACKGROUND

In many construction and assembly environments, such as automobile and aviation assembly environments, there is a need to ensure that rotating tools apply sufficient torque to fasteners. In this regard, in many assembly environments, certain bolts or nuts must be tightened to certain torque specifications to comply with assembly standards for structural integrity and safety.

Mechanical torque wrenches have been in use for many years. Such wrenches can be set to a desired torque (via a mechanical adjustor) and the wrench provides feedback to the user, typically via a click sound or a displacement of the wrench head, when the desired torque is reached. Due to their increased efficiency, power tools have become increasingly popular. Accordingly, new techniques for measuring torque being applied to a fastener are needed. Such solutions may find use in the power tool space, as well as the hand tool space.

BRIEF SUMMARY OF SOME EXAMPLES

According to some example embodiments, a rotating power tool is provided. The rotating power tool may comprise a motor, a bevel gear set, an antenna, a conductive spiral, a control antenna, and controller circuitry. The bevel gear set may comprise a bevel gear, and the bevel gear set may be configured to be driven by the motor to drive an output shaft of the rotating power tool. The antenna may be disposed on the bevel gear, and the conductive spiral may be electrically connected to the antenna. The conductive spiral may also be disposed on the bevel gear and the conductive spiral may be configured to, in response to the bevel gear deforming due to a torque being applied to the bevel gear, change a resistance of the conductive spiral. The control antenna may be disposed at a stationary position relative to the bevel gear. The controller circuitry may be operably coupled to the motor and the control antenna. The controller circuitry may be configured to control operation of the motor, and cause the control antenna to transmit a signal to induce a current in the antenna and cause a resonant circuit in the form of a tank circuit comprising the antenna and the conductive spiral to resonate and emit an output signal from the antenna. The output signal may have a frequency based on the resistance of the conductive spiral. The controller circuitry may be further configured to cause the control antenna to receive the output signal, and determine a torque measurement being applied to the bevel gear based on the frequency of the output signal.

According to some example embodiments, a rotating tool is provided. The rotating tool may comprise a gear, a conductive spiral, and an antenna. The conductive spiral may be disposed on the gear, and the conductive spiral may be configured to, in response to the gear deforming due to a torque being applied to the gear, change a resistance of the conductive spiral. The antenna may be electrically connected to the conductive spiral, and the antenna and the conductive spiral may comprise a resonant circuit that is configured to resonate and generate an output signal that is emitted from the antenna. The output signal may have a frequency that is based on the resistance value of the conductive spiral. The frequency of the output signal may be indicative of an amount of torque being applied to the gear.

According to some example embodiments, a method is provided. The method may comprise generating an excitation field to induce a current in an antenna disposed on a gear. The conductive spiral may be electrically connected to the antenna, and the conductive spiral may be configured to, in response to the gear deforming due to a torque being applied to the gear, change a resistance of the conductive spiral. The method may also comprise receiving an output signal from a resonant circuit comprising the antenna and the conductive spiral, and determining a frequency of the output signal. The frequency of the output signal may be based on the resistance of the conductive spiral. The method may also include determining a torque measurement based on the frequency of the output signal.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

According to some example embodiments, a torque sensor system is provided that can be used for determining a torque being applied by a rotating tool to, for example, a fastener (e.g., a bolt, nut, or the like) or a drill bit. For example, when rotating tools are used to tighten or loosen a fastener, a torque is applied to the fastener by the output shaft of the tool. The output shaft of the tool is therefore also subjected to a torque. The torque on the output shaft can be translated to a gear that the output shaft is affixed to, and this torque on the gear may operate to deform the shape of the gear as the torque on the gear increases. As such, being able to detect the degree of deformation of the gear can be used an indication of the torque being applied to the gear, and thus the torque being applied to the fastener.

According to some example embodiments, a conductive thread, having a known resistance, may be affixed to a face of the gear, for example, in a shape including a spiral. When the gear is deformed, the conductive thread may also be deformed, and the resistance across the conductive thread may change in response to the gear deformation. This change in resistance may have a relationship to the degree of deformation, which in turn may have a relationship to the torque applied to the gear.

The conductive thread may be a wire, a conductive ink, a resistive carbon paint, or the like, and the conductive thread may be applied to the face of the gear. When applied in the shape including a spiral, the conductive thread may be referred to as a conductive spiral for at least having a spiral component. The deformation of the gear, as described above and otherwise herein, may impact the conductive spiral across a length of the spiral, such that deformation of the gear physically affects the structure of the conductive spiral. For example, the conductive spiral may compressed or stretched causing the resistance across the conductive spiral to change in response to the deformation of the gear. Accordingly, a shearing compression on the conductive spiral may cause the resistance change in a first direction (e.g., increase or decrease) and a shearing tension on the conductive spiral may cause the resistance to change in a second direction, opposite to the first direction (e.g., decrease or increase). Whether the resistance increases or decreases may be function of the rotational direction of the torque and the orientation of the conductive spiral (e.g., spiraling clockwise from the interior to the exterior or spiraling counter-clockwise from the interior to the exterior).

To use the resistance of the conductive spiral as an indicator of applied torque, some example embodiments, employ a resonant circuit in the form of a tank circuit that transmits a wireless signal at a frequency that is based on the resistance of the conductive spiral. The resonant circuit may comprise the conductive spiral and an antenna. To cause the circuit to resonate and generate an output signal, a transmitter may output a wireless signal in the form of an excitation field that is received by the antenna and induces a current in the resonant circuit to thereby excite the resonant circuit (e.g., tank circuit) to generate and emit an output signal that has a frequency based on the resistance of the conductive spiral. The controller circuitry may be configured to tune the excitation field such that a resonance condition is obtained. The signal output from the resonant circuit may be received, by a receiver, and provided to controller circuitry for processing. The controller circuitry may be configured to analyze the received output signal to determine the frequency. Based on the frequency determination and a correlation between the frequency and an applied torque, a torque measurement being applied to the fastener can then be determined. Based on the torque measurement, the controller circuitry may be configured to take various actions, such as, for example, cause operation of the motor to stop because a tightening torque threshold has been achieved by the rotating tool.

As such, a torque sensor system can be realized, according to some example embodiments, that translates deformation of a gear connected to an output shaft of a rotating tool to a torque measurement. As further discussed below, such a solution may be employed on either rotating power tools such as, for example, a nut runner, or on hand tools such as, for example, a ratchet wrench.

Figure 1:
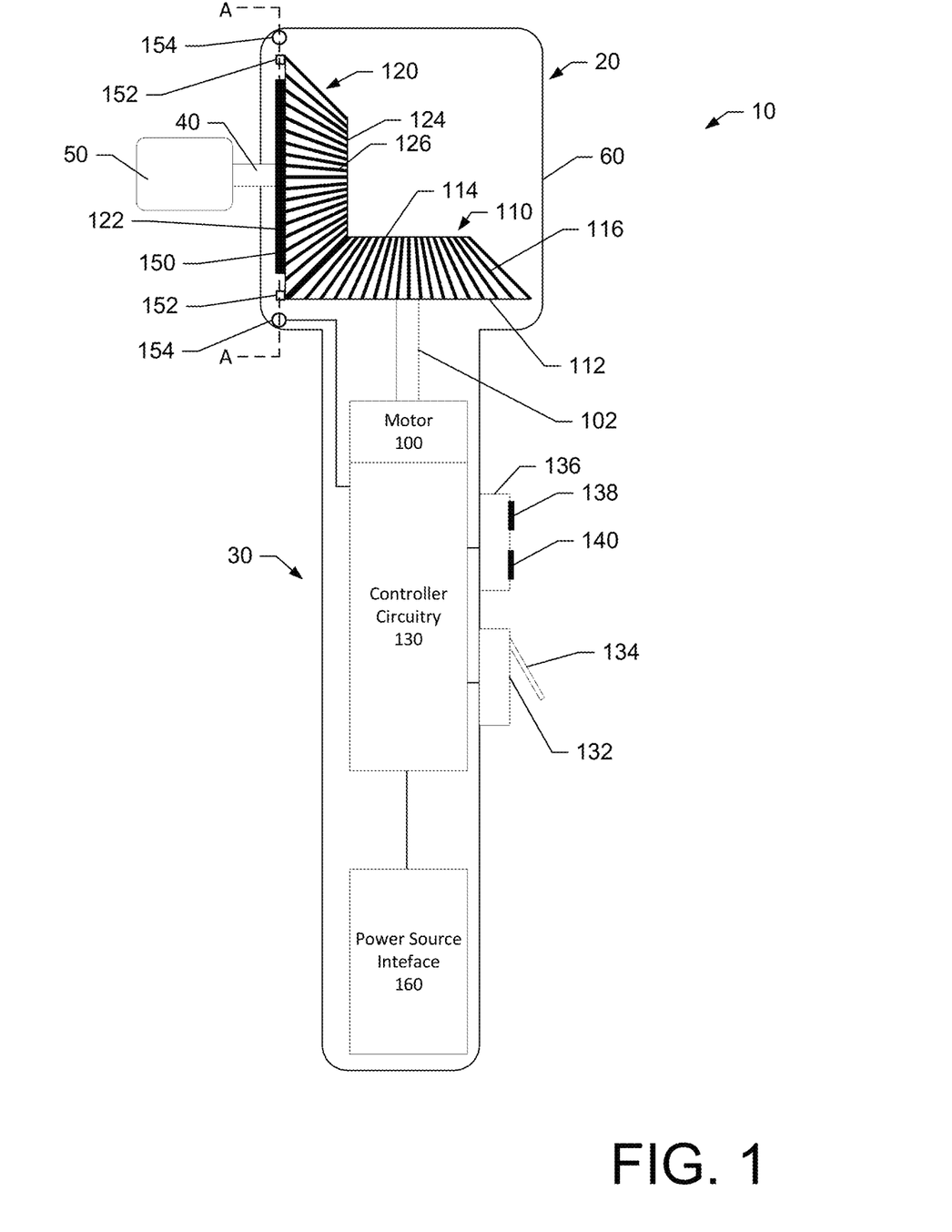
FIG. 1 shows an example rotating power tool in accordance with an example embodiment.

FIG. 1 shows an interior side view of an example rotating power tool 10, which may be, for example, a nut runner in accordance with an example embodiment. The rotating power tool 10 comprises a number of components that support operation of the rotating power tool 10 to drive an output shaft 40 and, for example, a fastener or drill bit (not shown) and measure the torque being applied. Generally, the rotating power tool 10 includes a head 20 and a handle 30. The head 20 may affixed to an end of the handle 30 and the head 20 may, in some example embodiments, house various gearing components configured to translate rotating motion from a motor 100 to a output shaft 40. The head 20 and the handle 10 of the rotating power tool 10 may be contained within a housing 60.

As mentioned above, the rotating power tool 10 may include a motor 100 that is configured to controllably rotate a motor shaft 102 to drive gearing and ultimately the output shaft 40. The motor 100 may be an electric (AC or DC) motor, a pneumatic motor, or the like. As shown in FIG. 1, the motor 100 may be disposed in the handle 30, but may alternatively be disposed in the head 20 or elsewhere depending on the structure of the rotating power tool 10. The motor 100 may, for example, be controlled to drive the motor shaft 102 in a forward (tightening) rotational direction or in a backward (loosening) rotational direction. The motor 100 may also be configured to operate at variable speeds and may have a maximum torque output rating.

The motor 100 may, according to some example embodiments, be controlled via controller circuitry 130. The controller circuitry 130 may be disposed in the handle 30 as shown in FIG. 1 or elsewhere, such as in the head 20. Controller circuitry 130 may include various electrical and electronic components, such as, for example, processing circuitry including one or more processors (e.g., microprocessors, application specific integrated circuits (ASICs), field programmable gate arrays (FPGAs), or the like). According to some example embodiments, the controller circuitry 130 may also include one or more memory device configured to store instructions for execution by the one or more processors.

According to some example embodiments, the controller circuitry 130 or the motor 100 may be operably coupled to a user interface for controlling the operation of the motor 100. Via the user interface, the user may be able to select the direction of rotation of the motor 100 and the speed of rotation. The user interface may include electromechanical controls such as switches for buttons or triggers. In some example embodiments, the user interface may include a display screen that is driven by the controller circuitry 130 to implement soft controls via a touch screen technology or the like. The user interface may be disposed, for example, on the handle 30 for ease of access to the user's hand during operation. As such, according to some example embodiments, for example, the controller circuitry 130 may include a control 136 that includes buttons 138 and 140. According to some example embodiments, when button 138 is depressed, control 136 may send a signal to controller circuitry 130, which may cause the controller circuitry 130 to set the motor 100 to a forward rotation mode. Similarly, according to some example embodiments, when button 140 is depressed, control 136 may send a signal to controller circuitry 130, which may cause the controller circuitry 130 to set the motor 100 to a backward rotation mode. Additionally, the user interface may include control 132 which may include a trigger 134. Control 132 may be configured to send a signal the controller circuitry 130 that is based on whether, and to what degree, the trigger 134 is depressed. According to some example embodiments, the trigger 134 with the control 132 may operate simply as an on/off switch for initiating and stopping rotation of the motor 100. According to some example embodiments, the trigger 134, with the control 132, may operate to provide a signal to the controller circuitry 130 that is based on the degree to which the trigger 134 is deflected by the user. In this manner, the control 132 and the trigger 134 may operate as a variable switch to support variable speed operation of the motor 100.

The rotating power tool 10 may also include a power source interface 160. The power source interface 160 may be an interface to an external power source or the power source interface 160 may include one or more power sources onboard the rotating power tool 10. For example, the power source interface 160 may include a connector to connect the rotating power tool 10 to external electric or pneumatic sources. Additionally, or alternatively, the power source interface 160 may include a local power source, such as a battery. According to some example embodiments, the power source interface 160 may include connections for connecting to the rotating power tool 10 to an external power source and may also include a local power source such as battery. Regardless of the configuration, the power source interface 160 may be configured to provide energy to the controller circuitry 130 and the motor 100 to operate the rotating power tool 10.

According to some example embodiments, to translate rotational movement of the motor shaft 102 to the output shaft 40, a gear set may be used. The gear set may include, for example a first gear 110 and a second gear 120. While a variety of gear sets having different inter-gear relationships may be employed according to some example embodiments, the rotating power tool 10 of FIG. 1 includes the motor shaft 102 being at a right angle to the output shaft 40, and therefore, the first gear 110 may rotate at a right angle relative to the rotation of the second gear 120. Therefore, to support the angular transition of the rotational motion, the gear set may be a bevel gear set with the first gear 110 and the second gear 120 being bevel gears.

The first gear 110 may comprise a motor shaft face 112 that is mechanically coupled to the motor shaft 102, possibly via intermediate mechanical components. The first gear 110 may also comprise a tooth-side face 114 that includes a plurality of teeth 116. The teeth 116 may be beveled or angled to facilitate mechanical engagement with the teeth 126 of the second gear 120. The second gear 120 may similarly comprise a output shaft face 122 that is mechanically coupled to the output shaft 40, possibly via intermediate mechanical components. The output shaft face 122 may be disposed on a surface that is on an opposite side of the second gear 120 to a plurality of gear teeth 126. In this regard, the second gear 120 may also comprise a tooth-side face 124 that includes a plurality of teeth 126. The teeth 126 may also be beveled or angled to facilitate mechanical engagement with the teeth 116 of the first gear 110. In operation, as the first gear 110 may turn due to rotation of the motor shaft 102 and being operably coupled thereto. The engagement between the teeth 116 and the teeth 114 may cause the second gear 120 to turn and thus the output shaft 40 due to being operable coupled to the second gear 120. As such, the output shaft 40 may be driven, via gear set comprising the second gear 120, by the motor 100.

According to some example embodiments, the output shaft 40 may extend outside of the housing 60. The output shaft 40 may be shaped or keyed to facilitate interchangeable engagement one or more rotating tool tips 50. A rotating tool tip 50 may take the form of various different tool tips, such as, a socket, a flat blade screwdriver tip, a cross-recess screwdriver tip, a hexagon tip, or the like. In some example embodiments, a drill chuck may be disposed on the output shaft 40 to facilitate affixing of a drill bit as the rotating tool tip 50.

As introduced above, according to some example embodiments, the rotating power tool 10 may also include a torque sensor system. The torque sensor system may comprise a conductive spiral 150, an antenna 152, a control antenna 154, and the control circuitry 130. In this regard, a conductive spiral 150 may be affixed to the second gear 120 to facilitate measuring a torque being applied by the rotating power tool 10. As shown in FIG. 1, the conductive spiral 150 may be affixed to the output shaft face 122 of the second gear 120. Further, an antenna 152, which may be electrically connected to the conductive spiral 150 at the ends of the conductive spiral 150, may also be affixed to the output shaft face 122 of the second gear 120.

The second gear 120, as well as the first gear 110, may be formed of a metallic material that may be conductive, such as, for example, various types of steel and steel alloys. As such, according to some example embodiments, an insulator layer (e.g., an insulating coating) may be disposed on the surface of the output shaft face 122 and under the conductive spiral 150 and the antenna 152 to electrically isolate the conductive spiral 150 and the antenna 152 from the conductive material of the second gear 120.

The control antenna 154 may operate as a transmitter or a receiver (e.g., a transceiver) and the control antenna 154 may be electrically coupled to and controlled by the controller circuitry 130. The control antenna 154 may be positioned at a stationary position relative to the second gear 120. For example, the control antenna 154 may be affixed to a non-rotating portion of the rotating power tool 10, such as the housing 60. According to some example embodiments, the control antenna 154 and antenna 152 may be disposed in a common plane (i.e., be co-planar) indicated by the line A-A to facilitate the efficient communication of electromagnetic signals between the antennas. Additionally, according to some example embodiments, the control antenna 154 may be disposed in the same plane (i.e., be co-planar) as the output shaft face 122 of the second gear 120, which may also be in the same plane as the conductive spiral 150.

Further, while the example embodiment of FIG. 1 shows, the antenna 152 and the conductive spiral 150 disposed on the output shaft face 122 of the second gear 120, it is contemplated that the antenna 152 and the conductive spiral 150 may be disposed on other surfaces that may be subjected to deformation due to the torque being applied by the rotating power tool 10. For example, may be disposed on a flat portion of the tooth-side face 124 of the second gear 120, the tooth-side face 114 of the first gear 110, or the motor shaft face 112 of the first gear 110. The antenna 152 and the conductive spiral 150 may still be disposed in a common plane in these other positions. Further, the control antenna 154 may also be positioned to be in a common plane with at least the antenna 152 in these other example positions.

Figure 2:
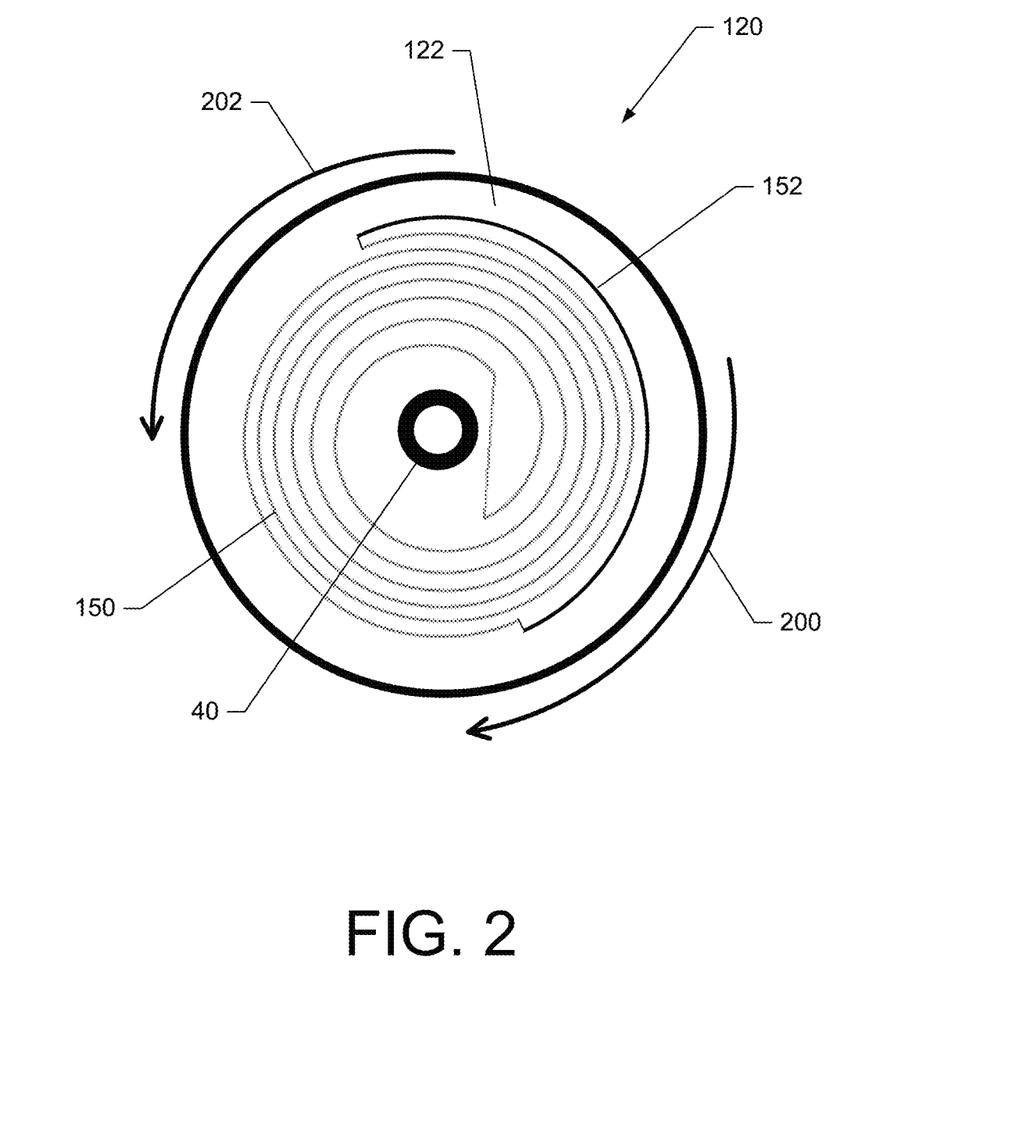
FIG. 2 is a view of the output shaft face of an example gear in accordance with an example embodiment.

Referring back to the example embodiment where the conductive spiral 150 and the antenna 152 are disposed on the output shaft face 122 of the second gear 120, FIG. 2 shows a view of the output shaft face 122 of the second gear 120. In this regard, the conductive spiral 150, the antenna 152, and the output shaft 40 are shown on the output shaft face 122 of the second gear 120 (possibly over an insulating layer as described above).

As mentioned above, the conductive spiral 150 may be formed by a conductive thread of any type of conductive material. For example, the conductive spiral 150 may be formed of a metal trace (e.g., aluminum, copper, or the like) that may adhered or etched onto the output shaft face 122. In some example embodiments, the conductive spiral 150 may be formed of a conductive ink or resin or a resistive carbon paint, and may be printed onto the output shaft face 122.

According to some example embodiments, the conductive spiral 150 may be disposed on the output shaft face 122 of the second gear 120 such that the conductive spiral 150 spirals or coils around the output shaft 40. According to some example embodiments, the conductive spiral 150 may include two spirals, as shown in FIG. 2, with a first spiral coiling in towards a center point and a second spiral, electrically connected to the first spiral that also coils in towards the center point. According to some example embodiments, the output shaft 40 may be disposed at the center point. The threads of the first spiral may be disposed in between the threads of the second spiral, such that the two spirals do not overlap and the ends of the spirals extend to an exterior of the conductive spiral structure. As such, the two spirals may facilitate connection of the antenna 152 to the conductive spiral 150 to form a circuit. The conductive spiral 150 may be positioned such that the conductive spiral 150 extends over a large portion (e.g., more than 50 or 75 percent) of the surface area of the output shaft face 122. Since the second gear 120 may distort to a larger degree near the internal, central edges of the gear due to the output shaft 40 being positioned centrally, the inner coils of the conductive spiral 150 may, according to some example embodiments, be placed adjacent (e.g., within a tenth of the radius of the output shaft face 122) of the edge of output shaft 40. The thickness of the thread and the pitch of the coils of the conductive spiral 150 may be selected based on the resistive properties of the selected material for forming the conductive spiral 150.

The antenna 152 may be formed of the same or similar materials as the conductive spiral 150. However, according to some example embodiments, the antenna 152 may be formed of a different material that more efficiently emits electromagnetic signals. The antenna 152 may be shaped as an arc such as a partial circle and may be electrically connected to the conductive spiral 150 at each end of the conductive spiral 150. The width and length of the antenna 152 may be based on the center frequency for the resonant circuit (e.g., tank circuit) formed by the conductive spiral 150, the antenna 152, the control antenna 154, and the controller circuitry 130. The center frequency of the resonant circuit may be the frequency of the output signal from the antenna 152 that is emitted when the second gear 120 is not be subjected to a torque (and therefore the second gear 120 is not being subjected to deformation). According to some example embodiments, the arc length of the antenna 152 may be one quarter wavelength at the center frequency.

The conductive spiral 150 shown in FIG. 2 coils towards a center point in a clockwise direction. As such, a torque applied to the second gear 120 in the direction 200 would tend put the conductive spiral 150 under a shearing compression to compress or shorten the conductive spiral 150 due to the deformation of the second gear 120. According to some example embodiments, this compression or shortening of the conductive spiral 150 may reduce the resistance of the conductive spiral 150 (i.e., change the magnitude of the resistance in a first direction) relative to the resistance of the conductive spiral 150 when the second gear 120 is subjected to no torque (i.e., the center resistance). On the other hand, a torque applied to the second gear 120 in the direction 202 would tend to put the conductive spiral 150 under a shearing tension to stretch or lengthen the conductive spiral 150 due to the deformation of the second gear 120. According to some example embodiments, this stretching or lengthening of the conductive spiral 150 may increase the resistance of the conductive spiral 150 (i.e., change the magnitude of the resistance in a second direction, opposite to the first direction) relative to the resistance of the conductive spiral 150 when the second gear 120 is subjected to no torque (i.e., the center resistance).

Figure 3:
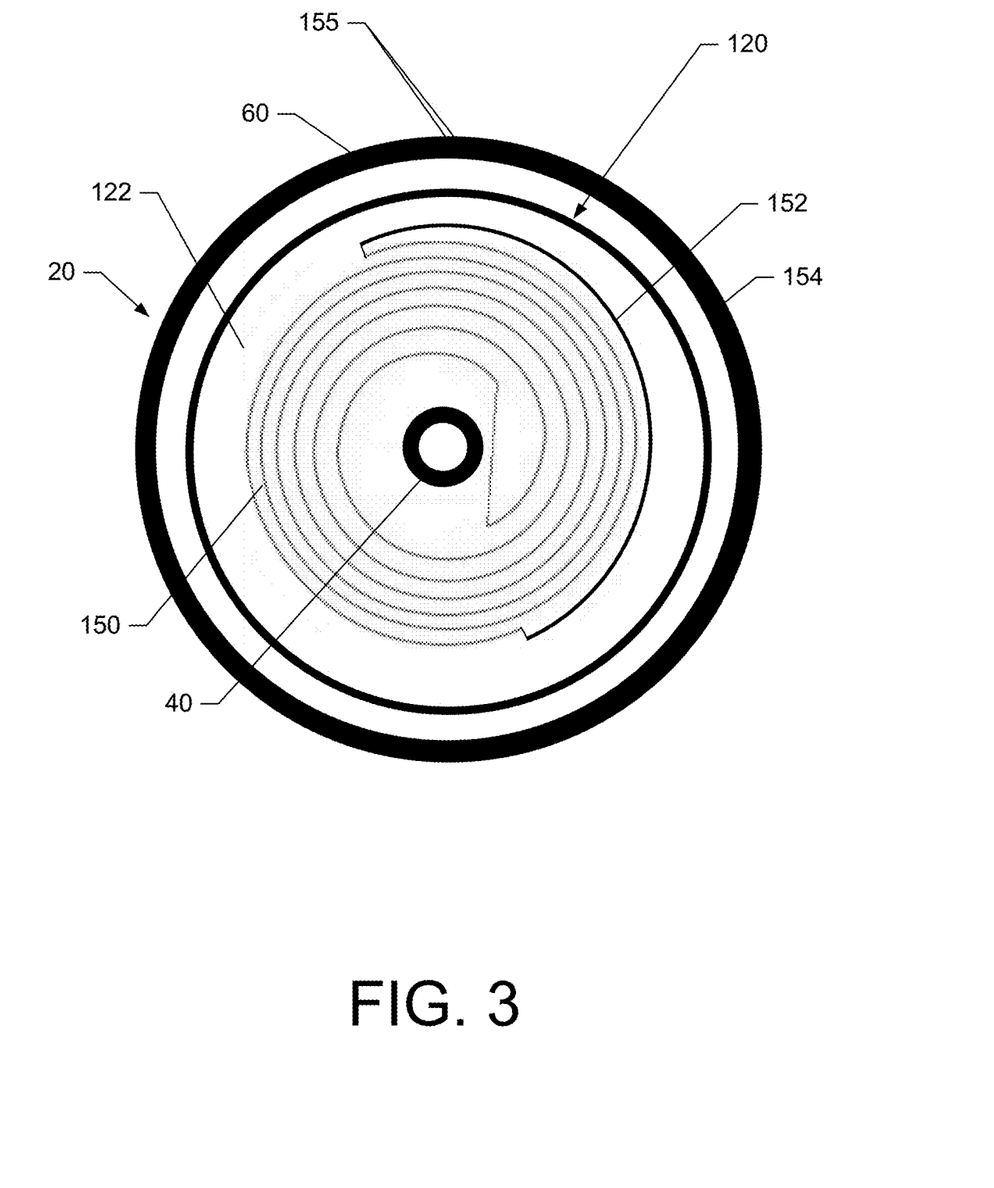
FIG. 3 is cross-section view of the rotating power tool of FIG. 1 taken at A-A in accordance with an example embodiment.

Referring now to FIG. 3, a cross-section view of the rotating power tool 10 taken at plane A-A that cuts through the head 20 is shown in accordance with an example embodiment. Since output shaft face 122 of the second gear 120 is in the plane A-A, the conductive spiral 150, the antenna 152, and the output shaft 40 can be seen. Additionally, the housing 60 of the rotating power tool 10 is shown at the outer extent. Further, the control antenna 154 is shown as being affixed or operably coupled to the housing 60. According to some example embodiments, the control antenna 154 may extend around an internal surface of the housing 60. Since, in this example embodiment, the housing 60 is circular, the control antenna 154 is disposed in a circular shape. According to some example embodiments, the control antenna 154 need not take the shape of the housing 60 and may therefore be affixed to other, non-rotating surfaces within the housing 60 to take different shape. Further, while FIG. 3 shows the control antenna 154 extending almost entirely around the interior of the housing 60, according to some example embodiments the control antenna 154 may extend only around a portion of the interior. The control antenna 154 may be formed of a conductive material, such as a material that may operate as an efficient antenna. The control antenna 154 may include one or two contacts 155 that are configured to electrically connect, via a wire or the like, to the controller circuitry 130. As such, the controller circuitry 130 may be connected to the control antenna 154 for either or both of transmitting and receiving wireless signals.

As such, the control antenna 154, under the control of the controller circuitry 130, may be configured to operate as a transmit or receive antenna. The control antenna 154 and the controller circuitry 130 together may operate as a transmitter, a receiver, or a transceiver. According to some example embodiments, the controller circuitry 130 may be configured to cause the control antenna 154 to transmit an excitation signal or field to the antenna 152. In doing so, the controller circuitry 130 may operate to complete a resonant circuit (e.g., tank circuit) that is tunable by the controller circuitry 130. In this regard, the controller circuitry 130 may monitor the signal returned to the controller circuitry 130 to determine a resonant condition in the formed resonant tank circuit. The frequency of the signal at the resonant condition may be used to determine the torque applied by the rotating power tool 10 as further described herein.

According to some example embodiments, the control antenna 154 may be configured to operate with respect to repeating time slots where in a first time slot the control antenna is a transmitting time slot and an immediately subsequent second time slot is a receiving time slot. Such transmit-receive time slots may be repeated during operation to facilitate both inducing an electric current in the resonant circuit formed by the conductive spiral 150 and the antenna 152 to generate and emit an output signal (e.g., a ringing signal) and receiving the output signal for analysis. In this regard, according to some example embodiments, the controller circuitry 130 may be configured to drive the control antenna 154 to transmit an excitation signal or field that excites the resonant circuit and causes the resonant circuit to generate an output signal. The controller circuitry 130 may be configured to tune the excitation signal or field such that the resonance condition is obtained to determine the frequency of the output signal. As such, the control antenna 154 and the controller circuitry 130 may be configured to operate as a transmitter configured to induce a current in the antenna 152 to cause a resonant circuit formed by the antenna 152 and the conductive spiral 150 to resonate and emit an output signal emanating from the antenna 152. The controller circuitry 130 and the control antenna 154 may also operate as a receiver that is configured to receive the output signal via the control antenna 154. Having received the output signal, the controller circuitry 130 may be configured to analyze the received output signal and, for example, perform tuning of the excitation signal to obtain a resonance condition and determine, for example, a torque measurement based on the frequency, as further described below.

As further described herein, the controller circuitry 130 may be configured to control operation of the rotating power tool 10 and the torque sensing system. In this regard, the controller circuitry 130, which may be operably coupled to the motor and the control antenna, may be configured to control operation of the motor 100, and cause the control antenna 154 to transmit a signal to induce a current in the antenna 152 and cause a resonant circuit formed by the antenna 152 and the conductive spiral 150 to resonate and emit an output signal from the antenna 152. The output signal may have a frequency based on the resistance of the conductive spiral 150. The controller circuitry may be further configured to cause the control antenna 154 to receive the output signal, and determine a torque measurement being applied to the second gear 120 based on the frequency of the output signal.

Figure 4:
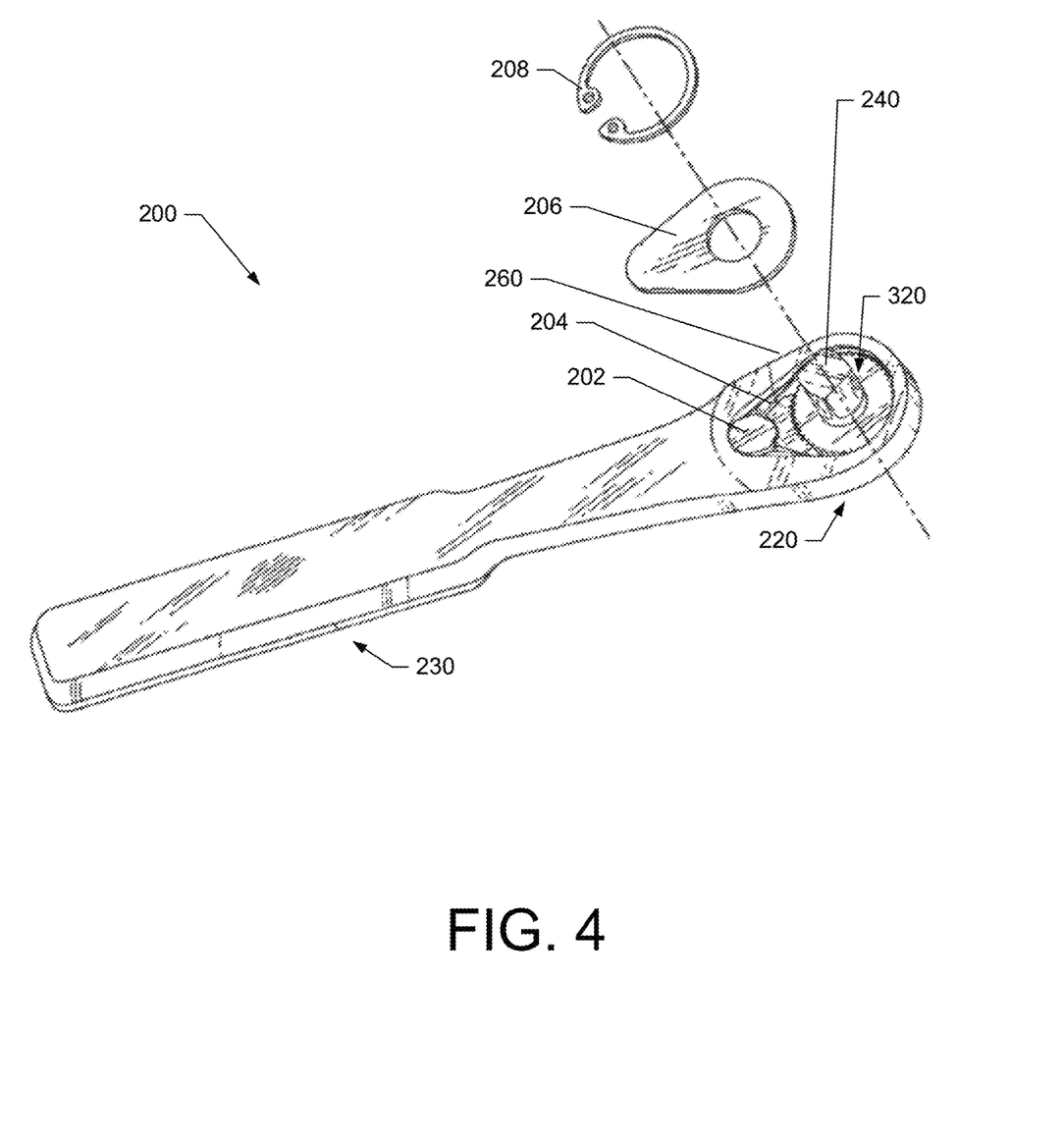
FIG. 4 shows an example rotating hand tool in accordance with an example embodiment.

Now referring to FIG. 4, a rotating hand tool 200 in the form of a ratchet wrench is shown that may also employ a torque sensing system, according to some example embodiments. The rotating hand tool 200 may include a head 220 and a handle 230. The exterior of the rotating hand tool 200 may include a housing 260, within which various components may be disposed. As a ratchet wrench, the rotating hand tool 200 may comprise a gear 320, a pawl 204, and pawl control 202. The cavity in which the gear 320, the pawl 204, and the pawl control 202 are disposed, may be closed by cover 206 and lock spring 208. Output shaft 240 may extend from the gear 320 and through an opening in the cover 206.

Figure 5:
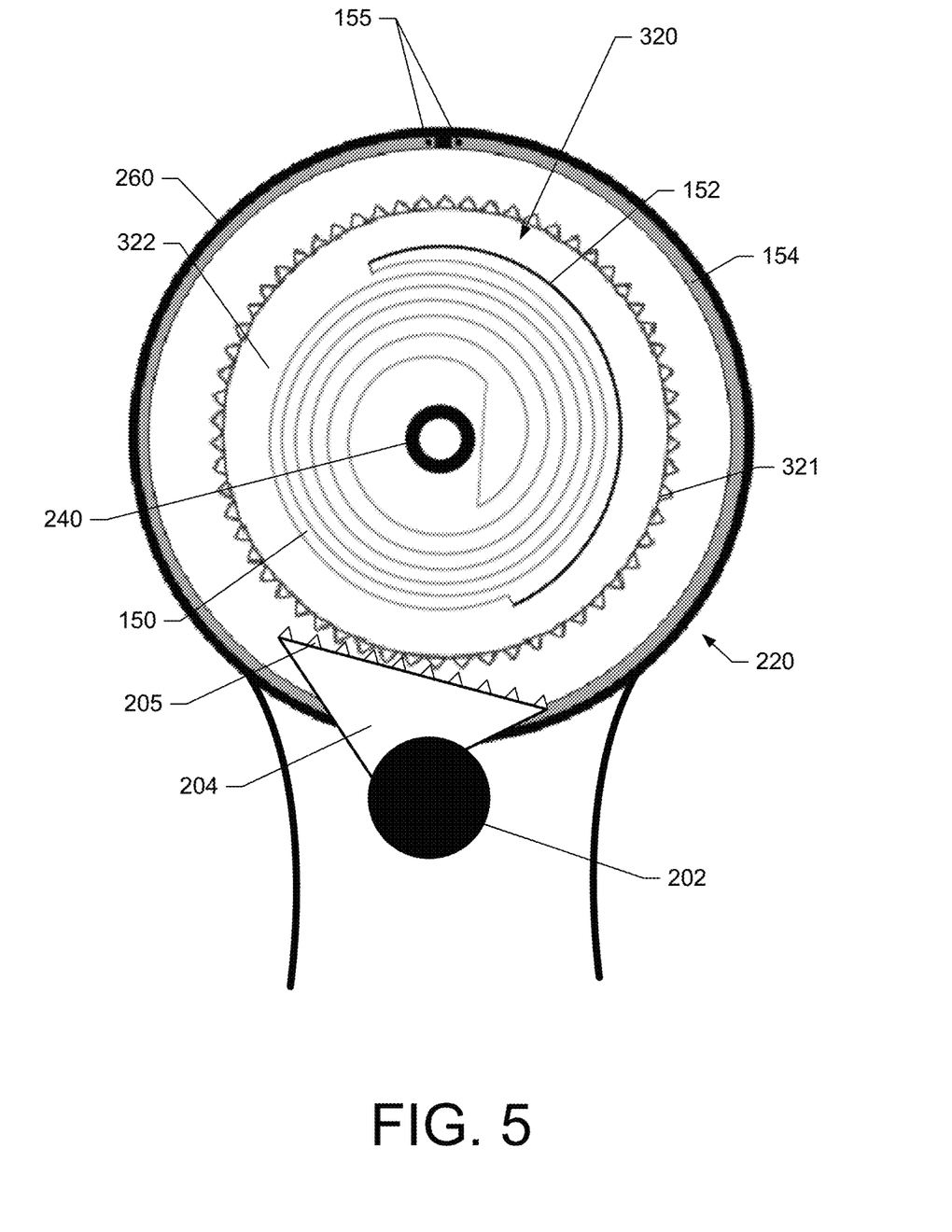
FIG. 5 is a cross-section view of the rotating hand tool of FIG. 4 showing the output shaft face of a gear in accordance with an example embodiment.

With reference to FIG. 5, an interior cross-section of the head 220 of the rotating hand tool 200 is shown. In this regard, similar to the rotating power tool 10, the control antenna 154 may be disposed on an interior surface of the housing 260 and may be connected to controller circuitry 130 (not shown in FIG. 5) via the one or more contacts 155. Additionally, the conductive spiral 150 and the antenna 152 may be disposed on the output shaft face 322 of the gear 320. Similar to the rotating power tool 10, when a torque is applied to the output shaft 240, the gear 320 may deform causing the resistance of the conductive spiral 150 to change in the same manner as described above for the rotating power tool 10. While not shown, the controller circuitry 130 may be disposed in the handle or elsewhere within the housing 260 and be in electrical connection with the one or more contacts 155 for the control antenna 154 to control the control antenna 154 as described herein.

The gear 320 may include ratchet teeth 321 that may be configured to engage with the pawl teeth 205 of the pawl 204. Via the pawl control 202, the pawl 204 may be configured to shift positions between a first position and a second position within the cavity in the housing 260. In the first position (e.g., shifted to the left as shown in FIG. 5), the rotating hand tool 200 may be configured to ratchet when the handle 230 is rotated in a first direction and apply a torque on, for example, a fastener when the handle 203 is rotated in a second opposite direction. The torque may be applied because the engagement of the pawl teeth 205 with the gear teeth 321 operate to prevent the gear 320 from turning relative to the handle 230 when the handle 230 is rotated in the second direction. To reverse the operation of the rotating hand tool 200, the pawl 204 may be shifted to the right by the pawl control 202. As such, with the pawl 204 positioned on the right, the rotating hand tool 200 may be configured to ratchet when the handle 230 is rotated in the second direction and apply a torque on, for example, a fastener when the handle 230 is rotated in the first direction due to engagement between the pawl teeth 205 and the gear teeth 321 as described above.

Figure 6:
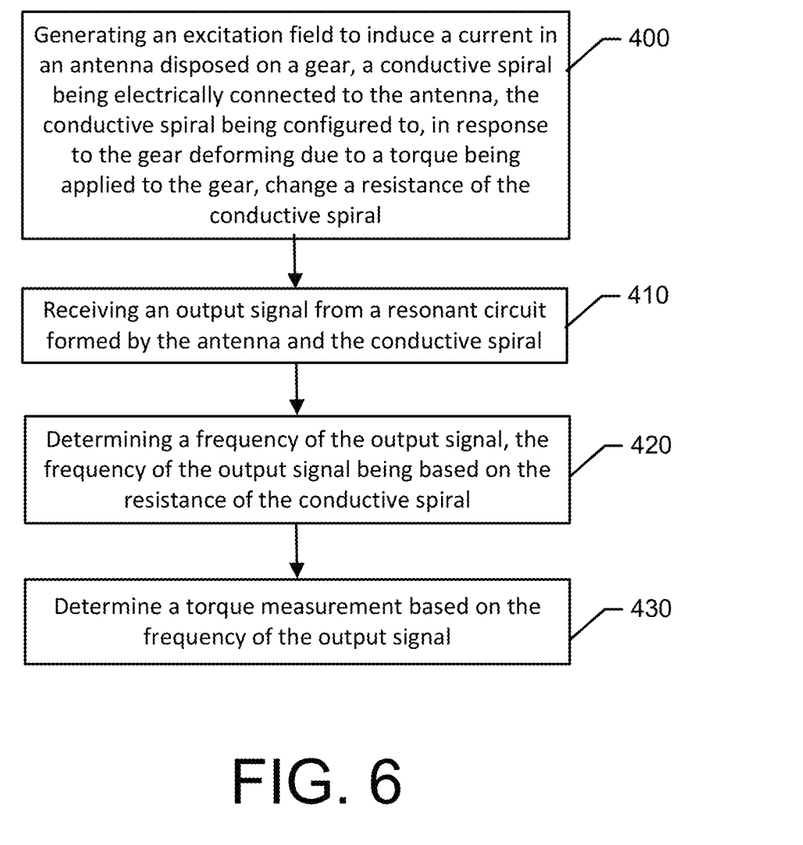
FIG. 6 shows a flow chart of a method for determining a torque applied to a gear in accordance with an example embodiment.

FIG. 6 shows a flow chart of an example method for determining a torque applied to a gear in accordance with an example embodiment. The example method of FIG. 6 may be performed by, for example, the controller circuitry 130 or components thereof (e.g., processor, memory, ASIC, FPGA, or the like).

In this regard, at 400, the example method may include generating an excitation field to induce a current in an antenna (e.g., antenna 152) disposed on a gear (e.g., gear 120 or 320). The excitation field may be generated by a control antenna (e.g., control antenna 154) under the control of controller circuitry (e.g., controller circuitry 130), which may be configured to drive the control antenna to generate the excitation field. According to some example embodiments, a conductive spiral (e.g., conductive spiral 150) may be electrically connected to the antenna, and the conductive spiral may be configured to, in response to the gear deforming due to a torque being applied to the gear, change a resistance of the conductive spiral.

According to some example embodiments, the example method may further comprise, at 410, receiving an output signal from a resonant circuit formed by the antenna and the conductive spiral. In this regard, the output signal from the resonant circuit may transmitted by the antenna of the resonant circuit to the control antenna to be received by the control antenna. Via electrical connection with the control antenna, the output signal may be received at the controller circuitry for analysis.

Additionally, the example method may include, at 420, determining a frequency of the output signal. The controller circuitry may be configured to determine the frequency of the output signal via a sampling process or other signal analysis techniques. According to some example embodiments, the controller circuitry may tune an excitation field or signal (e.g., a frequency of the excitation field or signal) received by the antenna to obtain a resonance condition (e.g., maximum gain) where the frequency can be determined. The example method may further include, at 430, determining a torque measurement based on the frequency of the output signal. In this regard, the controller circuitry may be configured to determine the torque measurement by utilizing a known relationship between the frequency and the torque. Such relationship, may be initially determined through experimental testing and then applied as a known relationship. The relationship may be determined as a best fit curve relationship to a series of data points determined during experimentation. As such, according to some example embodiments, a variable relationship in the form of an mathematical expression may be defined where the controller circuitry loads the expression from the memory device and inputs the frequency into the expression to determine the torque measurement. Alternatively, according to some example embodiments, a lookup table may be stored in the memory device and the controller circuitry may be configured to determine a frequency in the lookup table that is closest to the measured frequency to determine the torque measurement.

Additionally, according to some example embodiments, the example method may further include comparing the torque measurement to a torque setting to determine a difference. The torque setting may be, for example, a desired torque to be applied to a fastener. Additionally, the example method may include adjusting a power, by the control circuitry, to a motor (e.g., motor 100) driving the gear based on the difference to adjust a torque output of a rotating power tool (e.g., rotating power tool 10). Additionally, or alternatively, the example method may further comprise, in response to the torque measurement being within a tolerance range of a torque setting, interrupt power to a motor driving the gear, since, for example, a desired torque has been reached.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A rotating power tool comprising:
a motor;
a bevel gear set comprising a bevel gear, the bevel gear set configured to be driven by the motor;
an antenna disposed on the bevel gear;
a conductive spiral electrically connected to the antenna, the conductive spiral being disposed on the bevel gear and the conductive spiral being configured to, in response to the bevel gear deforming due to a torque being applied to the bevel gear, change a resistance of the conductive spiral;
a control antenna disposed at a stationary position relative to the bevel gear; and
controller circuitry operably connected to the motor and the control antenna, the controller circuitry being configured to:
control operation of the motor;
cause the control antenna to transmit a signal to induce a current in the antenna and cause a resonant circuit formed by the antenna and the conductive spiral to resonate and emit an output signal from the antenna, the output signal having a frequency based on the resistance of the conductive spiral;
cause the control antenna to receive the output signal; and
determine a torque measurement being applied to the bevel gear based on the frequency of the output signal.

2. The rotating power tool of claim 1, wherein the conductive spiral is disposed on a face of the bevel gear that is opposite a plurality of gear teeth.

3. The rotating power tool of claim 1, wherein the conductive spiral is disposed on a face of the bevel gear that is opposite a plurality of gear teeth;
wherein an output shaft extends from the face of the bevel gear, the output shaft being driven by the motor via the bevel gear; and
wherein the conductive spiral is disposed on the face of the bevel gear such that the conductive spiral spirals around the output shaft.

4. The rotating power tool of claim 3, wherein the conductive spiral is configured to change a magnitude of the resistance in a first direction in response to a shearing compression on the conductive spiral due to the applied torque on the bevel gear, and change the magnitude of the resistance in a second direction in response to a shearing tension due to the applied torque on the bevel gear.

5. The rotating power tool of claim 1 wherein the control antenna and the antenna are co-planar.

6. The rotating power tool of claim 1 wherein the conductive spiral and the antenna are co-planar.

7. The rotating power tool of claim 1 wherein the conductive spiral comprises two spirals with a thread of a first spiral being disposed between two threads of a second spiral.

8. The rotating power tool of claim 1 wherein the conductive spiral is formed by a resistive carbon paint.

9. The rotating power tool of claim 1 wherein the antenna is shaped as an arc.

10. The rotating power tool of claim 1, wherein the control circuitry is further configured to:
compare the torque measurement to a torque setting to determine a difference; and
adjust a power to the motor based on the difference to adjust a torque output of the rotating power tool.

11. The rotating power tool of claim 1, wherein the control circuitry is further configured to:

compare the torque measurement to a torque setting to determine a difference; and in response to the torque measurement being within a tolerance range of a torque setting, interrupt power to the motor.

12. A rotating tool comprising:

a gear;

a conductive spiral disposed on the gear, the conductive spiral being configured to, in response to the gear deforming due to a torque being applied to the gear, change a resistance of the conductive spiral; and an antenna electrically connected to the conductive spiral, the antenna and the conductive spiral forming a resonant circuit that is configured to resonate and emit an output signal from the antenna, the output signal having a frequency that is based on the resistance value of the conductive spiral, the frequency of the output signal being indicative of an amount of torque being applied to the gear.

13. The rotating tool of claim 12, further comprising a output shaft disposed on the gear and the conductive spiral being disposed around the output shaft.

14. The rotating tool of claim 12, further comprising a control antenna disposed in a housing of the rotating tool, the control antenna being configured to emit an excitation field to induce a current in the antenna, and receive the output signal emitted by the antenna.

15. The rotating tool of claim 12, wherein the conductive spiral comprises a resistive carbon paint.

16. The rotating tool of claim 12, wherein the antenna and the conductive spiral operate to form a resonant circuit.

* * * * *